United States Patent [19]

Zettler

[11] 3,818,797
[45] June 25, 1974

[54] DRAWBOLT FOR MACHINE TOOL SPINDLES

[75] Inventor: William D. Zettler, Fond du Lac, Wis.

[73] Assignee: Giddings & Lewis, Inc., Fond du Lac, Wis.

[22] Filed: May 10, 1973

[21] Appl. No.: 359,202

[52] U.S. Cl. .............................. 90/11 D, 408/239 A
[51] Int. Cl. ...................... B23b 31/10, B23q 3/152
[58] Field of Search .......... 90/11 A, 11 D; 408/238, 408/239, 240, 239 A

[56] References Cited
UNITED STATES PATENTS

| | | | |
|---|---|---|---|
| 1,961,129 | 6/1934 | DeHaas et al. | 90/11 D |
| 2,557,582 | 6/1951 | Turrettini | 90/11 D |
| 3,486,412 | 12/1969 | Schraub et al. | 408/239 A X |

Primary Examiner—Andrew R. Juhasz
Assistant Examiner—Z. R. Bilinsky
Attorney, Agent, or Firm—Harold E. Stohlgren

[57] ABSTRACT

A power operated rotary drawbolt for clamping tools in a machine tool spindle tool adapter socket in which the tool coupling end of the drawbolt includes a threaded fitting which is replaceable through the socket end of the spindle.

2 Claims, 4 Drawing Figures

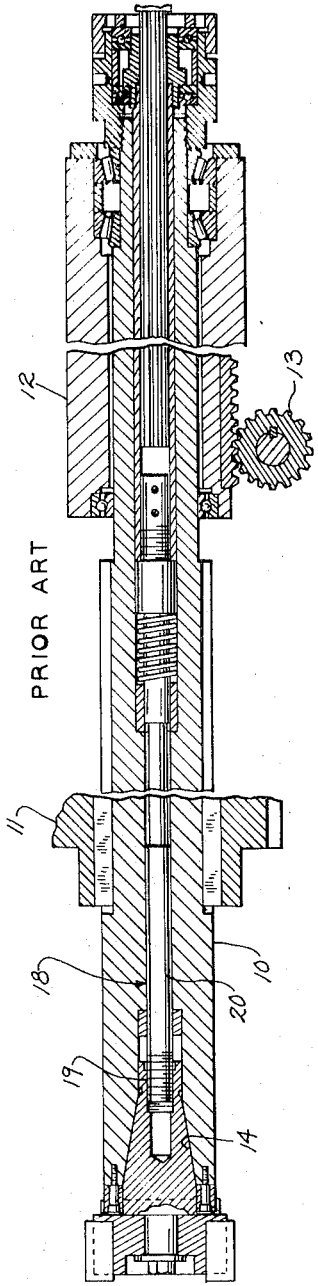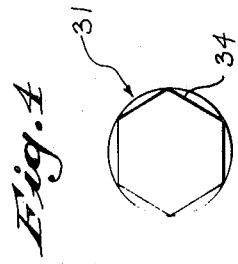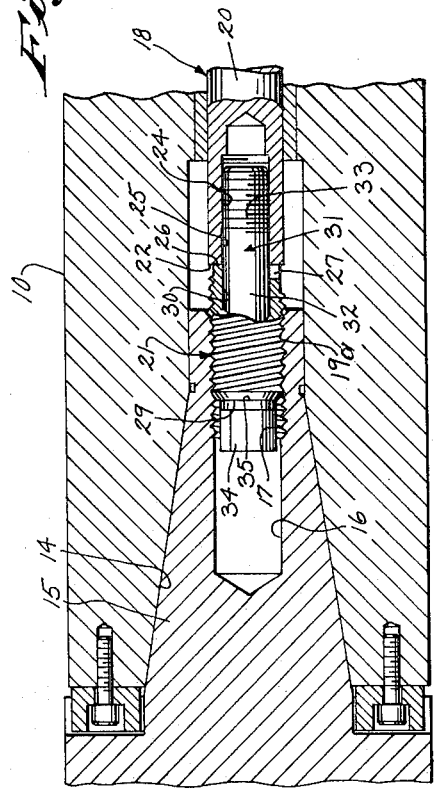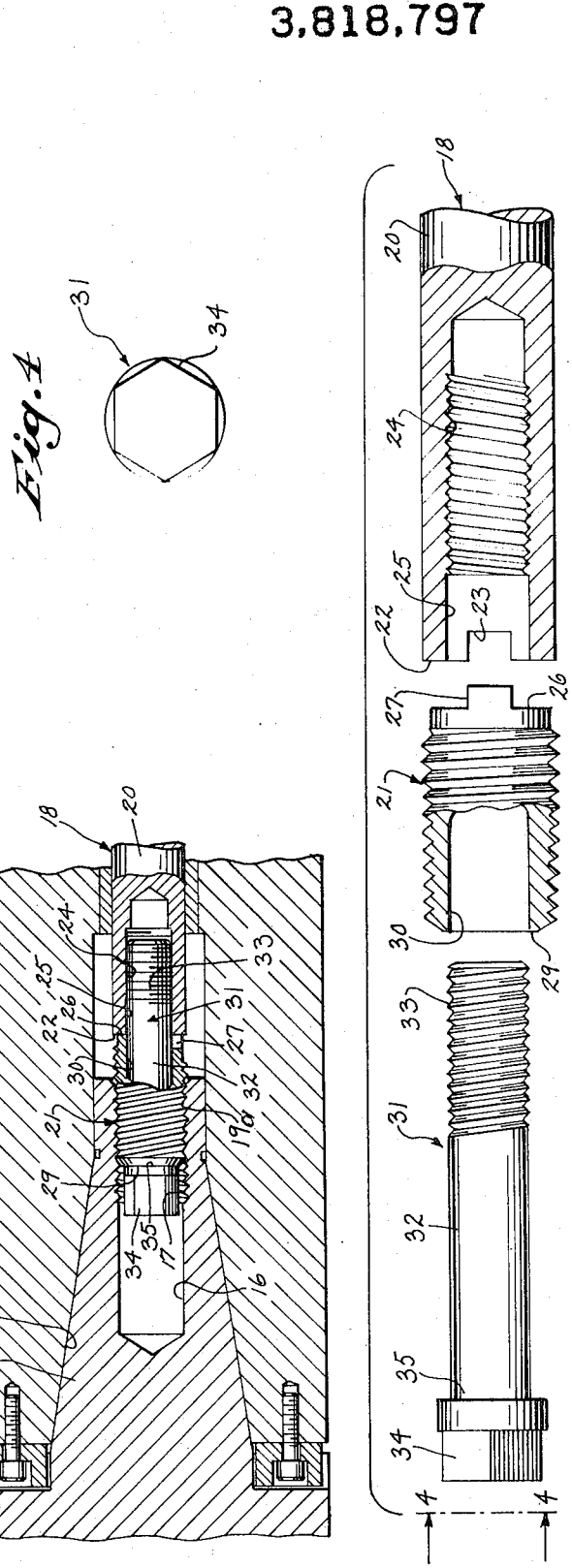

DRAWBOLT FOR MACHINE TOOL SPINDLES

This invention relates to power drawbolts for releaseably securing tool adapters to machine tool spindles. My U.S. Pat. No. 2,924,152 discloses a power operated rotary drawbolt of the type to which the present invention is applicable. This patented drawbolt has proven to be commercially successful. However, after many thousands of operating cycles, the threads on the outer end of the drawbolt which engage the tool adapter sometimes wear out requiring replacement of the entire drawbolt. Removal of the drawbolt, which must be done from the rear end of the spindle, requires partial dismantling of the machine. This in turn requires that there be sufficient space between the machine and adjacent structures to allow the lengthy drawbolt to be extracted from the spindle. Thus, replacement is time consuming and costly. The frequency of replacement has been intensified when the drawbolt is used on machines operating automatically or semi-automatically under numerical control.

The present invention retains the advantages of my prior patented drawbolt mechanism while eliminating the above cited shortcomings. Therefore, an object of this invention is to provide a power operated rotary drawbolt with a threaded end fitting that can be readily replaced without removal of the drawbolt assembly from the spindle.

Another object of the invention is to provide a machine spindle drawbolt with a replaceable threaded fitting which is secured by means having substantial strength and fatigue resistance.

Another object of the invention is to provide a replaceable threaded fitting which is secured to a spindle drawbolt by a screw of substantial shank diameter.

Another object of the invention is to provide a replaceable drawbolt threaded fitting, wherein a screw is used to attach the fitting to the drawbolt with the head of the screw extended beyond the end of the fitting, a construction which is compatible with standard milling machine tool adapters.

IN THE DRAWINGS:

FIG. 1 is a longitudinal fragmentary section view of a machine tool spindle equipped with a drawbolt mechanism such as shown in my U.S. Pat. No. 2,924,152.

FIG. 2 is an enlarged view in the area of the tool socket end of the spindle of FIG. 1, but showing the improved drawbolt structure according to the present invention.

FIG. 3 is an exploded view, partially in section of the improved drawbolt instruction.

FIG. 4 is an end view of the fastening bolt taken in the directions of 4—4 of FIG. 3.

Referring to FIG. 1, a tool spindle 10 is supported within a headstock housing (not shown) to be rotatably driven by gear 11 and axially translated by a ram 12 driven by feed pinion gear 13. The outer end of the spindle is formed with a tapered socket 14 which in the exemplary showing conforms to a standard ANSI milling machine spindle adapted to receive a standard tool adapter shank 15. The shank 15 has an axial bore 16 formed with an internal thread 17. The shank 15 is releaseably secured within the socket 14 by a drawbolt 18 having an inner end formed with an external thread 19 for engaging the thread 17 of the shank.

Details of the structure and operation of the drawbolt 18 and its drive transmission (not shown) are readily available by reference to my Pat. No. 2,924,152. Suffice it to say that the drawbolt 18 may be rotated in a right hand direction causing the thread 19 thereof to engage the threads 17 of the tool shank, thereby drawing the shank into firm engagement with the spindle socket 14. Rotation of the drawbolt in a left hand direction will cause the drawbolt to unthread itself from the tool shank to unclamp the shank and positively separate it from the spindle socket by applying an outward axial thrust on the shank during final portion of the thread engagement.

As shown in my above identified patent and FIG. 1, the threads 19 of the drawbolt 18 were formed integrally with the drawbolt. When the threads 18 became damaged or worn-out, it was necessary to replace the entire drawbolt. Such replacement requires partial dismantling of the headstock (not shown) followed by disconnecting the drawbolt 18 from the inner end of the spindle. After all this is done, the drawbolt can be removed from the rear end of the spindle and a new one is installed. This replacement operation required a substantial amount of clear area at the rear end of the machine to accommodate removel of the drawbolt. On occasion it has even been necessary to remove a window or make a hole in a wall to accomplish the replacement operation. Obviously, the above conditions were objectionable in terms of machine downtime and floor space requirements.

Referring to FIG. 2, the present invention includes a drawbolt shaft 20 which has a replaceable end fitting 21. This fitting is formed with external threads 19a, which as described above, engage the threads 17 in the adapter shank. Now when the threads 19a wear out from extended use or abuse, the fitting 21 is merely replaced with a new one in a simple and efficient manner as will be described hereinafter.

The invention provides that the fitting 21 be replaced by access through the socket 14 of the spindle with the adapter 15 removed of course. To that end, the end face 22 of the drawbolt shaft 20 is perpendicular to the drawbolt axis and includes a diametrically disposed keyway 23 formed thereon. A threaded bore 24 extends axially of the shaft 20 from the end face preceded by a short enlarged bore 25.

The fitting 21 has an end face 26 formed complimentarily to the end face 22 for supporting engagement therewith including a diametrically disposed key 27 for close fitting engagement with the keyway 23. The extreme outer end of the fitting is formed with an annular radial thrust bearing surface 29. A through bore 30 formed axially of the fitting 21 receives a screw 31 having a shank 32 with a threaded end 33 engageable with the threaded bore 24 of the shaft 20. The other end of the shank is formed with a hex head 34 which has an annular thrust bearing seat 35 complimentary to the surface 29 of the fitting.

The fitting 21 is fixedly attached to the shaft 20 by the application of sufficient torque applied to the screw head 34 by a wrench (not shown) inserted through the socket 14. A liquid thread locking material of which several well-known brands are available can be applied to the threads of the screw to provide a more secure coupling. The strength of the screw is maximized by a fillet between the head and the screw shank. The screw threads 27 are formed with a substantial root radius to increase fatigue strength. In addition, the screw shank and threads are machine ground to reduce points of possible stress concentration. Clearances between the shank 32 and bore 30 of the fitting and C'bore 25 of the shank are minimal so that the shank serves as a pilot to support the fitting concentrically with the drawbolt shaft 20.

With my above described invention, the fitting 21 may be replaced through the socket 14 of the spindle by using a suitable wrench to remove the screw 32 after which the fitting can be easily extracted. A new fitting and screw can then be inserted through the socket with the key 22 of the fitting into the keyway of the shaft. Tightening of the screw will then securely lock the fitting to the shafts to withstand torsional and axial loads applied by the power mechanism operating the drawbolt.

My invention has decreased the time required to repair a drawbolt with worn-out or damaged threads from eight or more hours to less than one hour. Replacement of the fitting and screw rather than the entire drawbolt shaft results in savings of parts cost and the feature can be added to existing machines by a retrofit operation.

As best illustrated in FIG. 2, the bore 16 of the standard ANSI milling machine tool adapter 15 provides ample axial and diametric clearance for the exposed head 34 of the screw 31. By taking advantage of this standard clearance space which allows the head 34 to be located externally of the fitting, the screw shank 32 can be made sufficiently large in diameter to provide the necessary strength to meet the extreme loading conditions under which the drawbolt operates.

I claim as my invention:

1. A power operated rotary drawbolt for releaseably clamping tools in a socket of a machine tool spindle comprising; a rotatably power driven drawbolt shaft formed with a threaded axial bore and a first positive coupling drive element at one end, an externally threaded fitting with an axial through bore and a first radial thrust bearing surface at one end and a second positive coupling drive element at the other end, a screw extending through the bore of the fitting with a close radial fit to threadably engage the end of the shaft and with a head forming a second radial thrust bearing surface located exteriorly and coaxially of the fitting to radially pilot and axially lock the fitting to the shaft upon engagement of the first and second positive drive elements and first and second radial thrust bearing surfaces.

2. A device according to claim 1 in which the bore of the shaft is formed with a relatively short cylindrical enlarged bore to pilot the screw and to evenly distribute thrust load on the positive coupling.

* * * * *